United States Patent
Komatsubara

(10) Patent No.: US 11,229,189 B2
(45) Date of Patent: Jan. 25, 2022

(54) ABSORBENT ARTICLE FOR PET ANIMAL

(71) Applicant: Unicharm Corporation, Shikokuchuo (JP)

(72) Inventor: Daisuke Komatsubara, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 653 days.

(21) Appl. No.: 15/772,569

(22) PCT Filed: Jul. 7, 2016

(86) PCT No.: PCT/JP2016/070064
§ 371 (c)(1),
(2) Date: May 1, 2018

(87) PCT Pub. No.: WO2017/077737
PCT Pub. Date: May 11, 2017

(65) Prior Publication Data
US 2018/0317455 A1  Nov. 8, 2018

(30) Foreign Application Priority Data

Nov. 2, 2015  (JP) .............................. JP2015-215915

(51) Int. Cl.
*A01K 23/00* (2006.01)
*B32B 5/02* (2006.01)
(Continued)

(52) U.S. Cl.
CPC .............. *A01K 23/00* (2013.01); *B32B 5/022* (2013.01); *B32B 5/18* (2013.01); *B32B 25/10* (2013.01);
(Continued)

(58) Field of Classification Search
CPC .......... A01K 23/00; B32B 5/022; B32B 5/18; B32B 25/10; B32B 2266/0278; B32B 2307/726; B32B 2307/728; B32B 2555/02
See application file for complete search history.

(56) References Cited

U.S. PATENT DOCUMENTS 8,020,523 B2 * 9/2011 Ikegami ................. A01K 23/00
119/869
9,113,612 B2 * 8/2015 Komatsubara ........ A61F 13/622
(Continued)

FOREIGN PATENT DOCUMENTS

JP       10-75679 A      3/1998
JP    2012-139128 A      7/2012
(Continued)

OTHER PUBLICATIONS

Extended European Search Report in EP Application No. 16861806.4, dated Oct. 5, 2018, 7pp.
(Continued)

*Primary Examiner* — Monica L Barlow
*Assistant Examiner* — Aaron M Rodziwicz
(74) *Attorney, Agent, or Firm* — Hauptman Ham, LLP

(57) ABSTRACT

Provided is an absorbent article for a pet animal being capable of prevent urine leaking out of a tail opening. The absorbent article includes a cutting line forming the fail opening positioned on a dorsal region side in an intermediate region and an indicator positioned on a body non-facing surface of an absorbent layer and to show a color reaction by coming in contact with excreted urine. The absorbent layer is positioned between the cutting line and a ventral region. The absorbent core has a first end edge and a second end edge opposite to the first end edge in a longitudinal direction, and the indicator is positioned longitudinally outboard (Continued)

of at least the first end edge of the first end edge and the second end edge.

4 Claims, 9 Drawing Sheets

(51) Int. Cl.
    *B32B 5/18*       (2006.01)
    *B32B 25/10*     (2006.01)
    *B32B 25/14*     (2006.01)

(52) U.S. Cl.
    CPC ...... *B32B 25/14* (2013.01); *B32B 2266/0278* (2013.01); *B32B 2307/726* (2013.01); *B32B 2307/728* (2013.01); *B32B 2555/02* (2013.01)

(56) References Cited

U.S. PATENT DOCUMENTS

| | | | |
|---|---|---|---|
| 9,456,886 B2* | 10/2016 | Komatsubara | A01K 23/00 |
| 9,872,480 B2* | 1/2018 | Komatsubara | A01K 23/00 |
| 9,888,671 B2* | 2/2018 | Komatsubara | A01K 23/00 |
| 9,894,881 B2* | 2/2018 | Komatsubara | A61F 13/49017 |
| 9,894,882 B2* | 2/2018 | Komatsubara | A01K 23/00 |
| 9,901,077 B2* | 2/2018 | Komatsubara | A01K 23/00 |
| 10,010,055 B2* | 7/2018 | Komatsubara | A01K 23/00 |
| 10,010,056 B2* | 7/2018 | Komatsubara | A01K 23/00 |
| 10,052,240 B2* | 8/2018 | Komatsubara | A61F 13/49 |
| 10,080,347 B2* | 9/2018 | Komatsubara | A01K 23/00 |
| 10,085,899 B2* | 10/2018 | Komatsubara | A61F 13/62 |
| 2005/0154367 A1* | 7/2005 | Ikegami | A01K 23/00 604/389 |
| 2010/0094235 A1 | 4/2010 | Solomon et al. | |
| 2014/0090608 A1 | 4/2014 | Komatsubara et al. | |
| 2015/0173968 A1* | 6/2015 | Joseph | A61F 13/5323 604/361 |
| 2015/0196009 A1 | 7/2015 | Komatsubara et al. | |
| 2017/0303512 A1* | 10/2017 | Komatsubara | A01K 23/00 |

FOREIGN PATENT DOCUMENTS

| | | |
|---|---|---|
| JP | 2012-205561 A | 10/2012 |
| JP | 2012-205579 A | 10/2012 |
| JP | 2013-34 A | 1/2013 |

OTHER PUBLICATIONS

International Search Report in PCT/JP2016/070064, dated Oct. 4, 2016, 4pp.

\* cited by examiner

ABSORBENT ARTICLE FOR PET ANIMAL

RELATED APPLICATIONS

The present application is a National Phase of International Application Number PCT/JP2016/070064, filed Jul. 7, 2016, which claims priority to Japanese Application Number 2015-215915, filed Nov. 2, 2015.

TECHNICAL FIELD

The present invention relates to absorbent articles used to collect and contain of body exudates of pet animals (may sometimes be designated simply pet(s)) such as canines and felines.

BACKGROUND ART

Conventionally, absorbent articles for pets such as canines and felines are well known. For example, Patent Literature 1 discloses an absorbent article for pets including a ventral region, a dorsal region and an absorbent layer (or absorbent batt layer).

PRIOR ART DOCUMENT

Patent Literature

Patent Literature 1: JP 1998-75679 A

SUMMARY OF INVENTION

Technical Problem

In the absorbent article disclosed in Patent Literature 1, a urinary excretion opening of a female dog is positioned facedly to the end of the absorbent layer on the side of a tail opening of the dog in a worn state of the article, and excreted urine is flowed/diffused toward the side of the tail opening in the article before the excreted urine is entirely flowed/diffused in the absorbent layer due to multiple repeatings of the urination. When the article is put on the dog, a caretaker cannot recognize from the outside that the dog has urinated, and the caretaker cannot also recognize from the outside that the excreted urine has flowed/diffused toward the side of the tail opening in the article. Thus, the caretaker cannot be sure timely when to change the articles, and the flowed/diffused urine may leak out of the tail opening.

An object of the present invention is to improve the conventional absorbent articles for pets including an indicator to show a color reaction by coming in contact with excreted urine and to provide an absorbent article for pets capable of preventing the excreted urine from leaking out of the tail opening.

Solution to Problem

The present invention is directed to an absorbent article for a pet animal having a longitudinal direction, a lateral direction, a thickness direction, a body facing surface, and a body non-facing surface, and including a ventral region, a dorsal region, an intermediate region extending the ventral and dorsal regions and an absorbent layer having an absorbent core and area end edge.

The absorbent article further includes a cutting line for forming a tail opening positioned adjacent to the rear end of the absorbent layer in the intermediate region, and an indicator positioned on the body non-facing surface of the absorbent layer and to show a color reaction by coming in contact with urine excreted by the pet animal. The absorbent layer is positioned between the cutting line and the ventral region. The absorbent core has a first end edge opposite to the cutting line and a second end edge opposite to the first end edge in the longitudinal direction. The indicator is positioned longitudinally outboard of at least the first end edge of the first end edge and the second end edge of the absorbent core.

The indicator includes a layered portion overlapped with the absorbent core in the thickness direction, and a non-layered portion extending longitudinally outboard of the absorbent core from the end edge of the absorbent core. With such an embodiment, the indicator has a function to let a caretaker know of the first urination and a function to let the caretaker know of exuding of urine from the end edge of the absorbent core.

The indicator is positioned only adjacent to the first end edge of the absorbent core. With such an embodiment, the caretaker can recognize the presence or absence of urination and suppress the material cost.

The cutting line has a shape convexly curved toward the dorsal region, and the non-layered portion of the indicator is positioned within an area defined by the cutting line. With such an embodiment, the non-layered portion positioned on the inner surface of the tongue piece is directly exposed outside, and the caretaker can recognize a color reaction of the indicator by comparing a color before and after changing of the indicator due to the color reaction.

The absorbent layer includes a hydrophilic core cover sheet covering at least one of the body facing surface and the body non-facing surface of the absorbent core, and the core cover sheet and the indicator are overlapped with each other in the thickness direction. With such an embodiment, the flowing/diffusing of the urine can be improved and the color reaction is can be promoted.

The core cover sheet has an end edge extending longitudinally outboard from the end edge of the absorbent core, and the end edge of the core cover sheet and the indicator are overlapped with each other in the thickness direction. With such an embodiment, the indicator comes in contact with not only the urine exuded from the end edge of the absorbent core, but also with urine flowed/diffused to the core cover sheet, and the color reaction can be promoted.

The absorbent article further includes a graphic area having a color being visible in outer surface view and a non-graphic area, and at least part of the indicator is overlapped with the non-graphic area in the thickness direction. With such an embodiment, the color reaction of the indicator is easy to recognize from the outside compared to when the indicator is overlapped with the graphic area.

Advantageous Effects of Invention

With the absorbent article for a pet animal according to one or more embodiments, the indicator is positioned longitudinally outboard of the absorbent core from at least one of the first end edge and the second end edge of the absorbent core, and the indicator shows the color reaction by the urine flowed/diffused longitudinally outboard of the absorbent core further extending from the at least one end edge, and the urine flowed/diffused outboard of the absorbent core can be recognized from the outside.

BRIEF DESCRIPTION OF DRAWINGS

The drawings illustrate specific embodiments of the present invention including optional and preferred embodiments as well as essential features of the invention.

DESCRIPTION OF EMBODIMENTS

Figure 1:
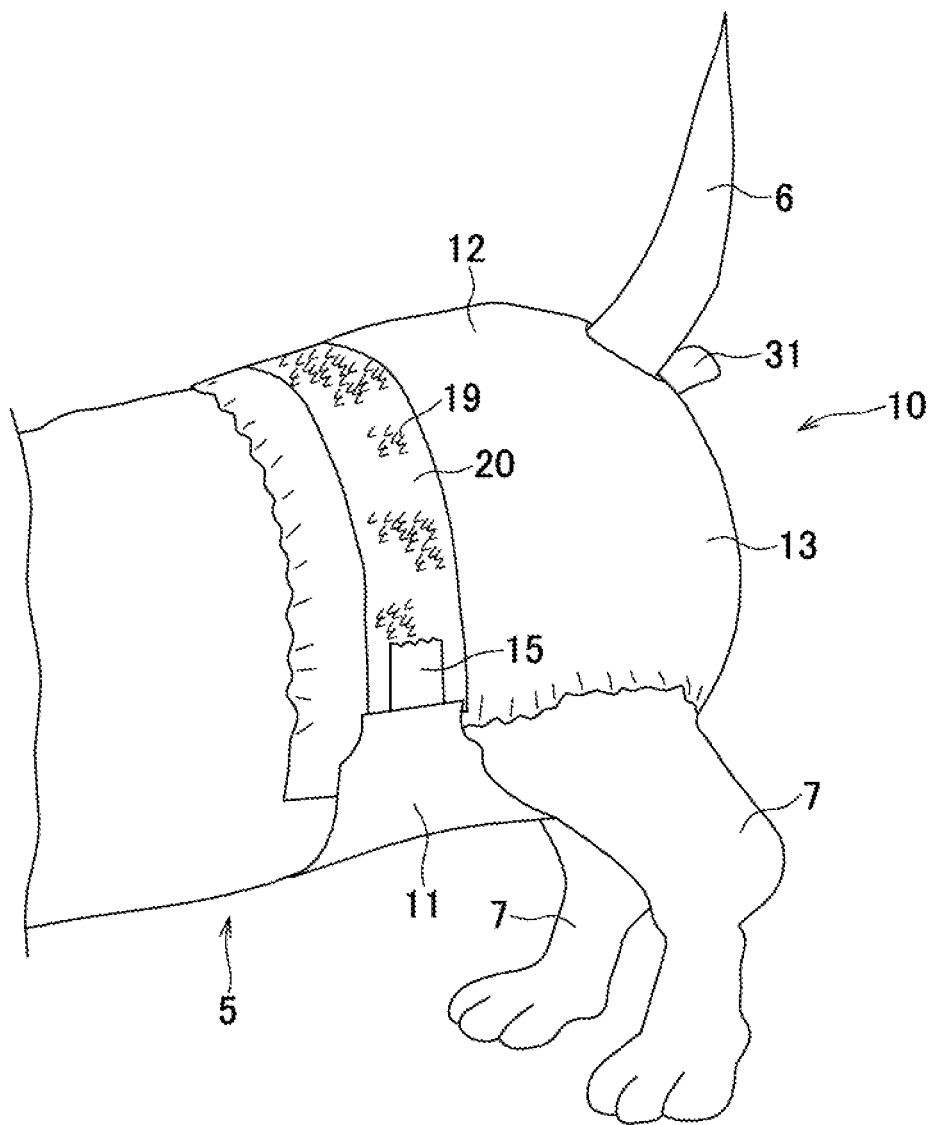
FIG. 1 is a perspective view illustrating a diaper put on a dog as one example of the absorbent article for a pet animal according to a first embodiment of the present invention.

The embodiments described below relate to a diaper for a dog as one example of a pet animal as illustrated in FIGS. 1 to 9, including both optional and preferred features as well as those features which are essential features of the present invention.

With reference to FIGS. 1 to 4, a diaper 10 for a dog as one example of an absorbent article for a pet animal has a longitudinal direction Y, a lateral direction X, a thickness direction Z, a body facing surface, and a body non-facing surface opposite to the body facing surface, and includes a diaper body 14 including a ventral region 11, a dorsal region 12, an intermediate region 13 extending between the ventral and dorsal regions 11, 12, and a pair of fastening tabs 15 (engaging means). The ventral region 11 and the dorsal region 12 respectively cover the dog's stomach region and the dog's loin region positioned in front of the dog's rear legs 7, and the intermediate region 13 covers the dog's rump including its thighs entirely. The absorbent article 10 has a longitudinal axis P bisecting a dimension in the lateral direction X thereof and a lateral axis Q bisecting a dimension in the longitudinal direction Y thereof.

A pair of fastening tabs 15 attached to the ventral region 11 each have a first fastening element 18 composed of hooks on the body facing surface of a mechanical fastener. On the other hand, the dorsal region 12 is provided on its outer surface with a target area 20 having a second fastening element 19 composed of loops of the mechanical fastener, extending in the lateral direction X for releasably engaging with the first fastening elements 18 of the fastening tabs 15. A loin opening and a pair of leg openings are formed by releasably engaging the first fastening element 18 with the second fastening element 19 when putting the diaper 10 on the dog 5.

For a fastening system composed of the first fastening element 18 and the second fastening element 19, the first fastening element may be pressure sensitive adhesive applied onto the surface of a base sheet forming the fastening tab 15 instead of the hooks as long as the pressure sensitive adhesive has the required peel strength. In this instance, the pressure sensitive adhesive may be covered with a separator coated with silicone to protect its surface.

The base sheet for forming the fastening tab 15 is preferable to be, for example, comparatively high stiff and tensile strength sheets including plastic films, fibrous nonwoven fabrics, laminates of them, or craft paper. Moreover, a first fastening element 18 provided on a ventral side flap described later may be releasably engaged directly on the second fastening element 19 without using the fastening tab 15 as long as a required effect is achieved.

The diaper body 14 is preferable to have a dimension L1 in the longitudinal direction Y of 300 mm to 600 mm and a dimension W1 in the lateral direction X of 200 mm to 400 mm.

<Diaper Body>

The diaper body 14 has first and second end edges 14a,14b extending in the lateral direction X being spaced apart from each other in the longitudinal direction Y and both lateral side edges (leg opening edges) 14c, 14d each extending in the longitudinal direction Y while having a concave edge between the first and second end edges 14a, 14b. The diaper body 14 further includes a liquid permeable inner sheet layer 22 lying on the body facing surface and a liquid impermeable outer sheet layer 23 formed of moisture permeable plastic films, fibrous nonwoven fabrics or laminates of them, lying on the non-body surface, and an absorbent layer 25 interposed between the inner and outer sheet layers 22, 23. The inner sheet layer 22 and the outer sheet layer 23 extend out of a peripheral edge of the absorbent layer 25, thereby forming extending portions which are joined to each other with hot melt adhesive (not shown) applied to at least one of their facing surfaces. A leakage barrier sheet layer 26 is disposed between the inner and outer sheet layers 22, 23 and on the bottom of the absorbent layer 25, and fixed with hot melt adhesive (not shown) to at least one of facing surfaces of the inner and outer sheet layers 22, 23.

Figure 2:
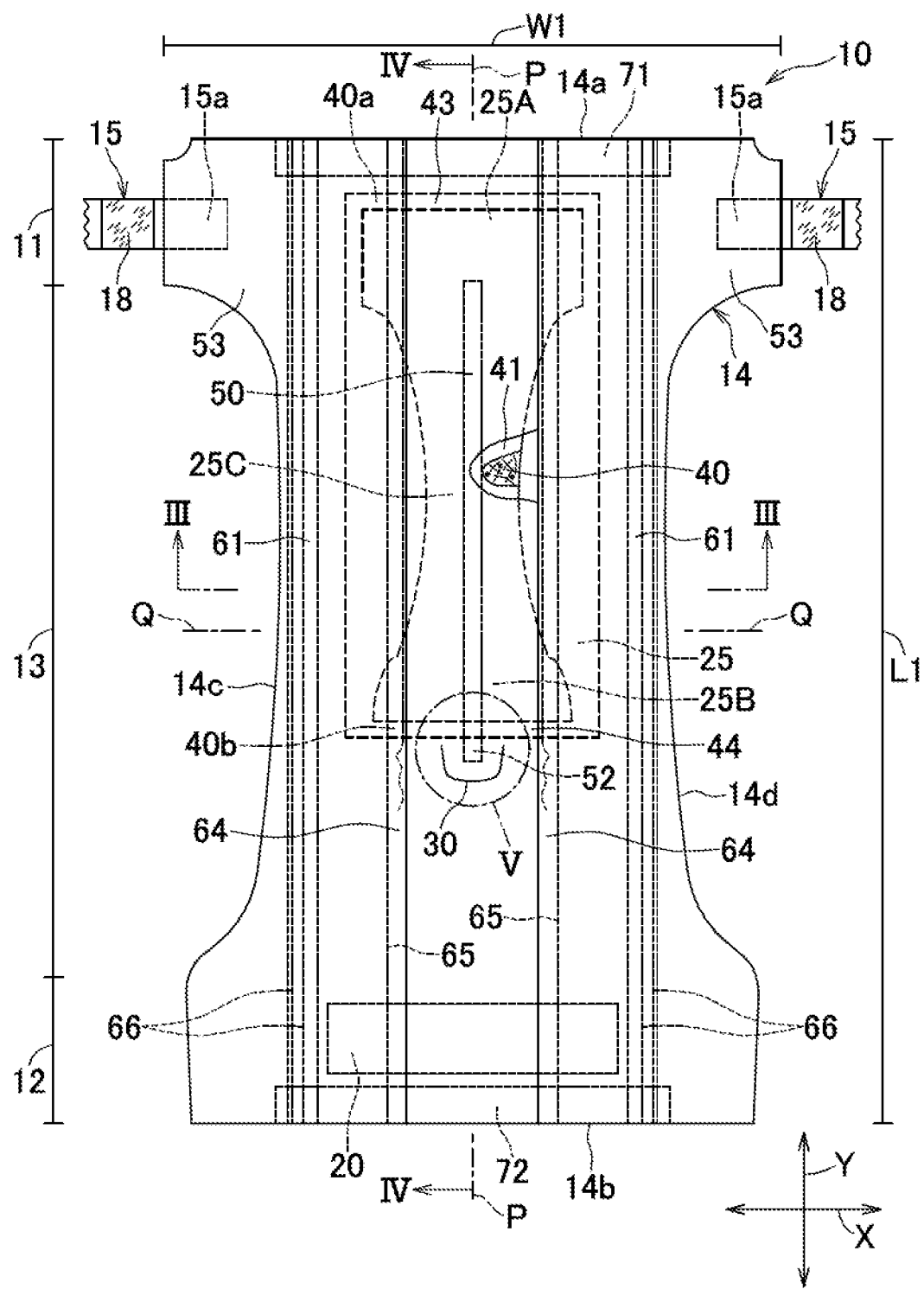
FIG. 2 is a partially cutaway plan view of the diaper flat-opened up to respective elastic members have been stretched in vertical and lateral directions to the respective maximum elongations (to the extent that gathers under contractions of the respective elastic members substantially disappear).
Figure 3:
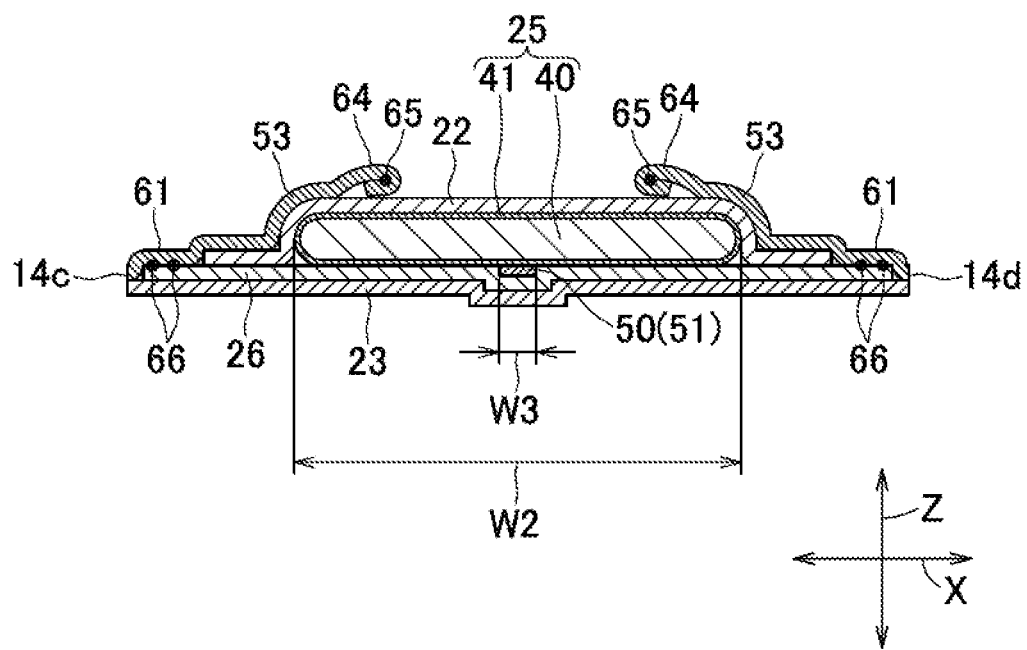
FIG. 3 is a schematic cross-sectional view taken along line III-III in FIG. 2.
Figure 4:
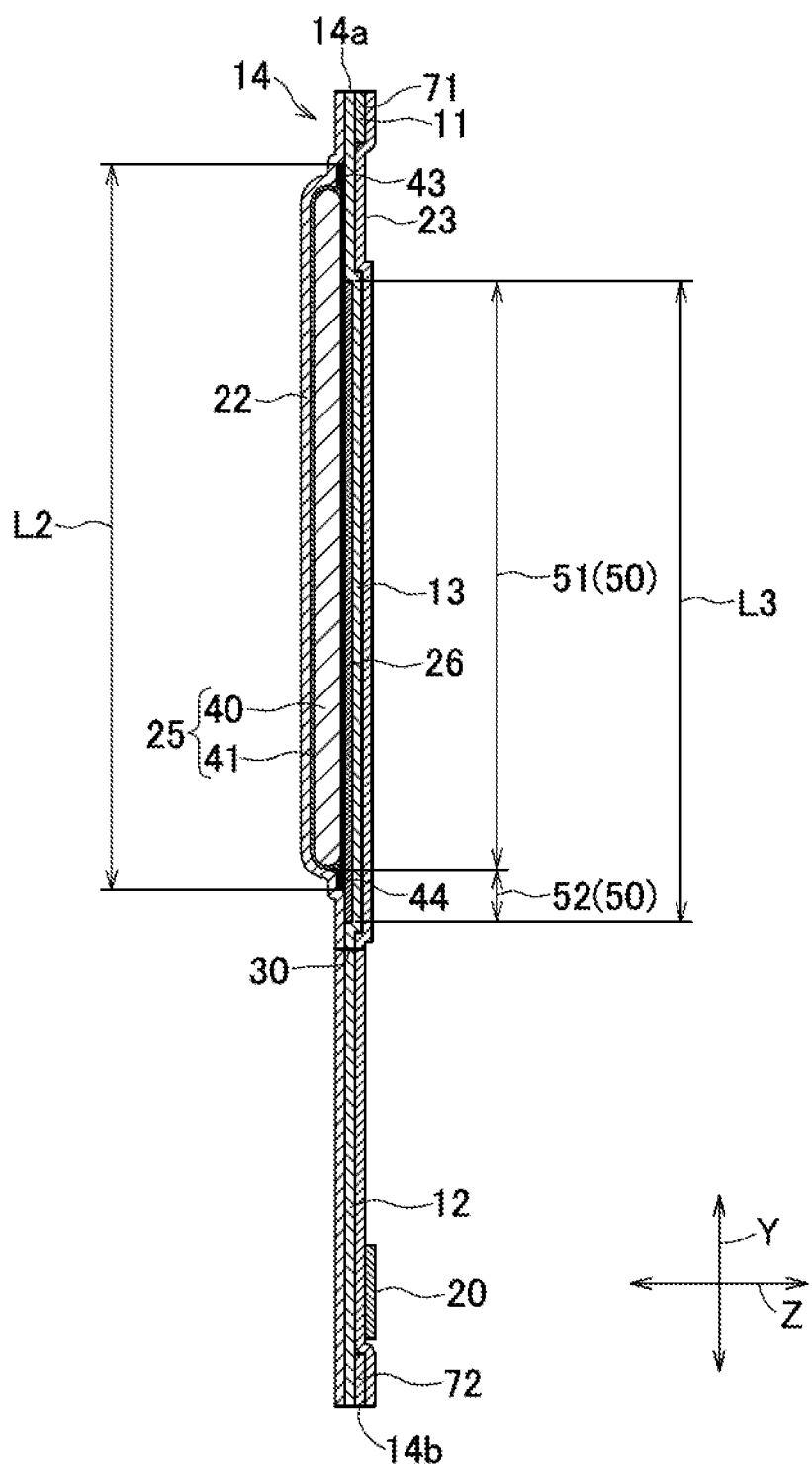
FIG. 4 is a schematic cross-sectional view taken along line IV-IV in FIG. 2.

With reference to FIGS. 2 to 4, a cutting line 30 to form a tail opening for passing through the tail 6 of the dog 5 is positioned closer to a second end 25B (described later) of the absorbent layer 25 than the dorsal region 12. The cutting line 30 passes through the inner sheet layer 22, the leakage barrier sheet layer 26 and the outer sheet layer 23 overlapped with each other in planar view.

Part of the diaper body 14 is cut along the cutting line 30 to form a tongue piece 31, and the tongue piece 31 in which each sheet layer 22, 23, 26 is in a state joined or non-joined to each other is folded outward to form a tail opening. Not only it is preferred that the tail opening has a size to pass through the tail 6, but also it is possible to face the tail opening with the anal positioned just below the tail 6 so that body exudates excreted from the anal can be discharged outside. In this way, the passing through of the tail and the exposing of the anal make it possible to prevent the body exudates excreted in the diaper body 14 from getting caught in the fur. Moreover, the tongue piece 31 may be separated from the diaper body 14, and the body exudates excreted out of the anal can be prevented from adhering to the tongue piece 31.

The absorbent layer 25 is positioned between the cutting line 30 and the ventral region 11, and has a first end 25A positioned at the side of the first end 14a of the diaper body 14, a second end 25B positioned at the second end 14b of the diaper body 14 and an intermediate portion 25C positioned between the first and second ends 25A, 25B and being narrower than these ends 25A, 25B.

The absorbent layer 25 includes an absorbent core 40 and a core cover sheet 41 covering at least one of the body facing and body non-facing surfaces of the absorbent core 40. The absorbent core 40 has a semi-rigid panel shape formed of a mixture of superabsorbent polymer particles having water absorbing properties 10 times or more water-insoluble and self-mass, optionally containing thermoplastic fibers, and is contoured by front and rear end edges 40a, 40b extending in the lateral direction X and both lateral side edges extending in the longitudinal direction Y. The core cover sheet 41 is formed of hydrophilic and liquid diffusible fibrous fibers or tissue paper, and has both ends 43, 44 extending in the longitudinal direction Y from front and rear end edges 40a, 40b.

In the present embodiment, the absorbent layer 25 extends from the ventral region 11 toward the intermediate region 13 without positioning in the dorsal region 12. Regardless of the male and female, the external excretory organs of the dog 5 are positioned in the stomach/region side adjacent to the dog tail 6, and the excreted body exudates (e.g., urine) does not flow/diffuse toward the dog's back side in the usual standing-up state of the dog 5 wearing the diaper, and the absorbent layer 25 may be positioned in the intermediate region 13 and the ventral region 11 at least facing the external excretory organ. Such an arrangement of the absorbent layer 25 makes it possible to improve the absorption efficiency and to reduce a production cost of the diaper compared to the case where the absorbent layer 25 extends to the dorsal region 12 toward which the excreted body exudates do not flow/diffuse, and makes it possible to prevent the dorsal region 12 from being stiff and from being stuffy by improving air permeability therein.

With reference to FIGS. 2 to 5, an elongate indicator 50 extending in the longitudinal direction Y is disposed between the absorbent layer 25 and the leakage barrier sheet layer 26. The indicator 50 is formed by a hot melt adhesive agent containing reagents for color reaction (e.g., PH indicator) that is subjected to color reaction by coming in contact with moisture such as urine and other body fluids. As used herein, the term "color reaction" refers to the case where white similar to that of sheet materials constructing the diaper 10 changes to chromatic colors such as red, blue and other colors, and a chromatic color changes other chromatic colors. The indicator 50 may be formed from well-known various patterns such as multiple lines or a single line, a spirally continuous or discontinue line or lines, dots, a circle or a rectangle. Although not shown, a body facing surface of the indicator 50 may be partially covered with a cover sheet having a hydrophobic and water resistance to appropriately control the speed of the color reaction.

The absorbent layer 25 has a dimension L2 in the longitudinal direction Y corresponding to about 30% to about 50% of a dimension L1 in the longitudinal direction Y of the diaper 10, preferably about 40% of a dimension L1 in the longitudinal direction Y of the diaper 10, and a dimension W2 in the lateral direction X corresponding to about 30% to about 50%, preferably about 40% of a dimension W1 in the lateral direction X of the diaper 10. Moreover, in order for a caretaker to be able to recognize a color after changed from the outside when the indicator 50 has been subjected to color reaction, the indicator 50 is preferable to have a dimension L3 in the longitudinal direction Y thereof corresponding to about 70% to about 90% of a dimension L2 in the longitudinal direction Y of the absorbent layer 25, and a dimension W3 in the lateral direction X thereof corresponding to about 1.0% to about 10%, preferably about 2% to about 5% of a dimension W2 in the lateral direction X of the absorbent layer 25. As described later, the indicator 50 is preferable to extend from the middle in the longitudinal direction Y of the absorbent layer 25 to the dorsal region 12 so that a caretaker may recognize the indicator 50 in back view of the dog 5.

Figure 5:
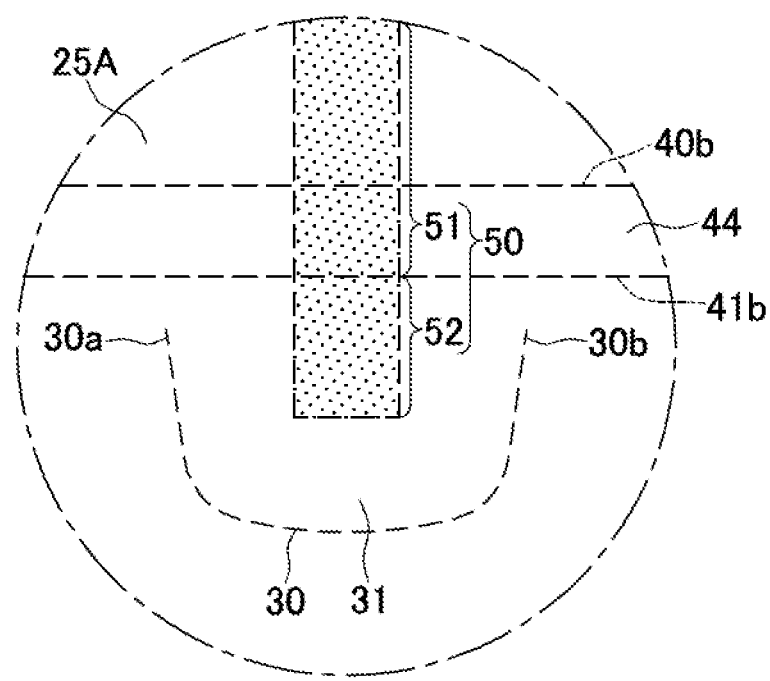
FIG. 5 is a partially enlarged area encircled by a dot-dash line in FIG. 2.
Figure 6:
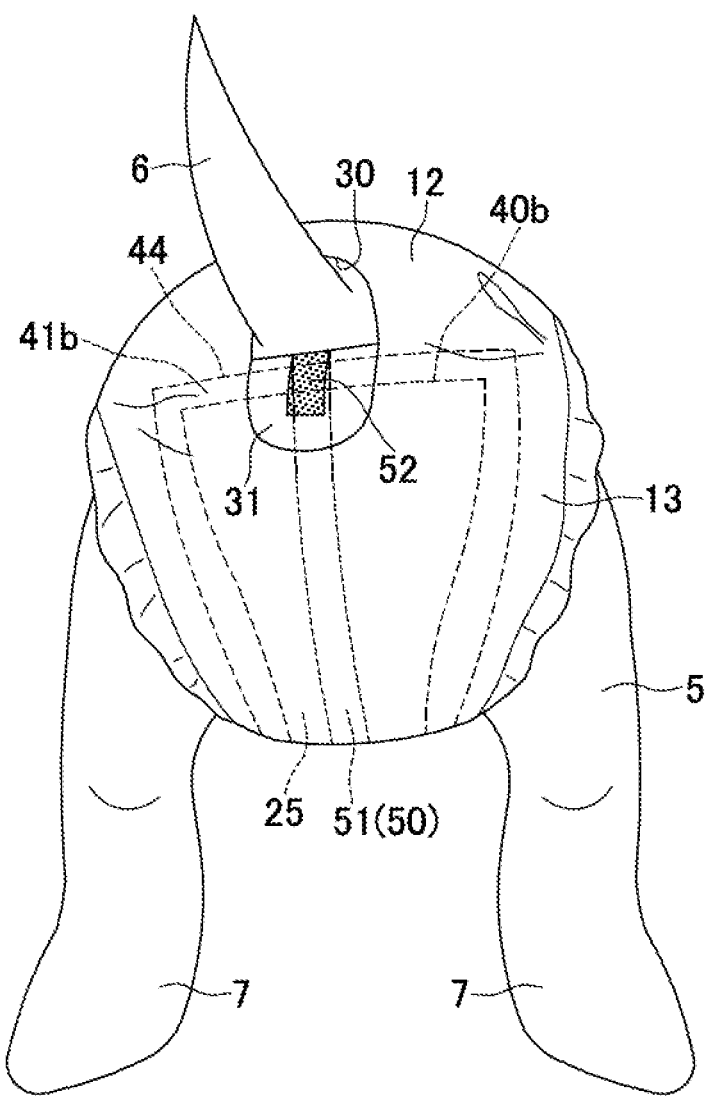
FIG. 6 is a perspective view of the back of the dog wearing the absorbent article.

With reference to FIGS. 5 and 6, the indicator 50 further has a layered portion 51 overlapped with the absorbent core 40 in a thickness direction Z and a non-layered portion (an extension) 52 extending from the layered portion 51 to the second end edge 14b and further extending from the rear end edge 40b of the absorbent core 40 outboard of the longitudinal direction Y. The non-layered portion 52 of the indicator 50 is overlapped with the front end 43 of the core cover sheet 41 extending from the rear end edge 40b outboard in the longitudinal direction Y, and its portion is positioned within the tongue piece 31 defined by the cutting line 30 being convex toward the second end edge 14b. In other words, part of the non-layered portion 52 extends toward the convex top of the cutting line 30 beyond both ends 30a, 30b of the cutting line 30 between both ends 30a, 30b. In this way, the non-layered portion 52 of the indicator 50 positioned within the tongue piece 31 defined by the cutting line 30 makes it possible to directly recognize the non-layered portion 52 of the indicator 50 from the outside. This is because the tail opening has been formed by cutting the cutting line 30 and the tail 6 of the dog 5 has been passed through the formed tail opening, and the tongue piece 31 is turned inside out and its inside surface is exposed.

With reference again to FIGS. 2 and 3, a pair of containment flaps 53 are disposed symmetrically about the longitudinal axis P outboard in the lateral direction X of the absorbent layer 25 on the body facing surface of the inner sheet layer 22. The containment flaps 53 have each a proximal edge 61 forming part of each of both side edges of the diaper body 14, front and rear ends fixed on the body facing surface of the inner sheet layer 22 and the outer sheet layer 23, and a distal edge 64 extending in the longitudinal direction Y between the front and rear ends, with each inner edge of the containment flaps 53 folded inward. The distal edge 64 has at least one flap elastic member 65 composed of thread-, string- or strand-like elastic materials extending in the longitudinal direction Y secured in a contractible manner under tension. The distal edge 64 is spaced away from the body facing surface of the inner sheet layer 22 toward the dog's body under a contractile force of the flap elastic member 65, thereby preventing body exudates from leaking sideways.

Moreover, between the proximal edge 61 of the containment flap 53 and the leakage barrier sheet 26, at least one side elastic member 66 composed of thread-, string- or strand-like elastic materials is secured in a contractible manner under tension. The outer sheet layer 23 and the containment flap 53 are overlapped with each other extending outboard in the lateral direction X of both sides of the inner sheet layer 22 and the leakage barrier sheet in the ventral and dorsal regions 11, 12, thereby forming a ventral side flap and a dorsal side flap.

Between the outer sheet layer 23 and the containment flap 53 forming the ventral side flap, a proximal end of each of a pair of fastening tabs 15 is fixedly interposed with hot melt adhesive (not shown) applied onto inner surfaces of the outer sheet layer 23 and the containment flap 53.

In the present embodiment, the flap elastic member 65 and the side elastic member 66 are composed of thread-, string- or strand-like elastic materials having each a fineness in about 280 dtex to about 500 dtex and contactibly secured under tension at a stretch ratio in a range of about 2.0 to about 3.0, preferably in a range of about 2.2 to 2.5, a space-apart dimension between adjacent elastic members can be set appropriately by a contractile force required to each elastic member 65, 66. Moreover, the fineness and the stretch ratio of each elastic member 65, 66 can be set so as to be different from each other without being equal to each other. In the present embodiment, the side elastic member 66 extends over a full length of the diaper body 14 in the longitudinal direction Y, i.e., extends continuously in the longitudinal direction Y between the first end edge 14a and the second end edge 14b, while the flap elastic member 65 may extend to the side of the dorsal region 12 beyond the absorbent layer 25 from the first end edge 14a.

The ventral region 11 and the dorsal region 12 of the diaper body 14 are respectively disposed with belt-like ventral and dorsal elastic members 71, 72 extending in the lateral direction X along the first and second end edges 14a, 14b between the inner sheet layer 22 and the leakage barrier sheet 26. The ventral and dorsal elastic members 71, 72 may be formed of rubber threads, flat rubbers, or ribbon-like elastics which are made from natural or synthetic rubber, or foamed polyurethane. In the present embodiment, flat rubbers formed of foamed polyurethane are used as the elastic members 71, 72. The ventral and dorsal elastic members 71, 72 are preferable to have a required width (a dimension in the longitudinal direction Y) to fit the ventral and dorsal regions 11, 12 to the dog's body by exerting a contractile force of these elastic members over a relative wide range in these ventral and dorsal regions. Both longitudinal ends of the side elastic members 66 are each overlapped with both lateral ends of the ventral and dorsal elastic members 71, in planar view.

With reference to FIG. 6, the indicator 50 extends from the stomach region of the dog 5 to the tail opening in planar view when the diaper 10 is worn. Thus, when the dog 5 has urinated, the indicator 50 shows a color reaction by coming in contact with the urination, and a caretaker can easily recognize the urination while the diaper 10 is being put on the dog 5 without being taken off. If the indicator 50 is positioned only on the dog's stomach region, the caretaker needs to detect the presence or absence of urination in a state turned the dog 5 face up. However, in the present embodiment, the indicator 50 extends from the stomach region to the tail opening so that the indicator 50 can reliably come in contact with the urine, and the caretaker can detect the presence or absence of urination in a standing state as well as when walking.

Generally, in an absorbent article such as a diaper for an infant and an elderly person in need of care, the article is replaced with new one at one time of urination to avoid diaper rash and discomfort. However, in an absorbent article for a dog for example, the article may be replaced with new one after several times of urination without replacing new one at one time of urination, in addition to rash hardly causing, to be difficult to easily put the article on the dog due to the dog's assuming a rigid posture or moving. Thus, even if the caretaker has detected the urination by the indicator, he or she may not change the diapers, and for a female dog, since its external excretory organ faces an end of the absorbent layer in the dorsal region, before the absorbed urine in the absorbent core flows/diffuses from the end of the absorbent layer toward the ventral region, the urine may be leaked out of the tail opening due to the flowing/diffusing of the urine from the rear end edge of the absorbent core toward the longitudinal direction outside.

In the diaper 10 according to the present embodiment, when a female dog 5 has urinated, the urine flows/diffuses from the second end 25B facing the external excretory organ toward the intermediate portion 25C. At this time, the layered portion 51 of the indicator 50 shows a color reaction by coming in contact with body fluids (e.g., urine), which can be recognized from the outside, and the caretaker can visually recognize the (first) urination. In such a state, when an absorbed ratio in the absorbent layer 25 by the urination, in other words, a utilization ratio at the second end 25B of the absorbent layer 25 and its vicinity by the urination is less than 100%, the urine does not exude from the rear end edge 40b to the longitudinal direction outside, and the non-layered portion 52 does not show a color reaction without coming in contact therewith. Thus, the caretaker can determine that the urine should not leak out of the tail opening.

The dog 5 further repeats one more than urination, and the utilization ratio at the second end of the absorbent layer 25 and its vicinity become more than 100%. Thus, the urine exudes in the longitudinal direction outside and the non-layered portion 52 of the indicator 50 shows a color reaction by coming in contact with the urine. Thus, the caretaker can recognize that the urine may leak out of the tail opening and can change the diapers 10 promptly. In this way, the indicator 50 has a function that the caretaker can recognize the (first) urination by the layered portion 51 overlapped with the absorbent core 40 in the thickness direction Z, and a function that the caretaker can recognize that the urine may leak out of the tail opening by the non-layered portion 52 not overlapped with the absorbent core 40 in the thickness direction Z. The indicator 50 has both such functions, and the caretaker can determine the timing of changing the diapers 10 at the first time of urination and after one more than urination.

With reference again to FIG. 5, part of the non-layered portion 52 of the indicator 50 is overlapped, in the thickness direction Z, with the core cover sheet 41 further extending outboard of the longitudinal direction Y from the rear end 40b of the absorbent core 40, and the non-layered portion 52 shows a color reaction also by the urine flowed/diffused to the rear end edge 40b of the core cover sheet 41. In this way, since the non-layered portion 52 shows the color reaction by the urine flowed/diffused to the core cover sheet 41, the color reaction of the non-layered portion 52 is promoted, and the caretaker can recognize that the urine may leak out of the tail opening, caused by further urination, due to the color reaction of the non-layered portion 52 before the urine exudes from the rear end edge 40b to the outside. However, the non-layered portion may not be overlapped with the core cover sheet 41 in the thickness direction X without extending from the rear end edge 40b of the absorbent core 40b to the longitudinal direction Y outside, as long as the color reaction speed can be adjusted so that the caretaker can change the diapers 10 at appropriate timing without the urine leakage out of the tail opening.

In addition, the core cover sheet 41 is not overlapped with part of the cutting line 30, and the urine flowed/diffused to the rear end edge 40b of the core cover sheet 41 may not leak out of the tail opening edge. Moreover, part of the non-layered portion 52 of the indicator 50 is overlapped with the tongue piece 31, and the non-layered portion 52 positioned on the inner surface of the tongue piece is exposed in a worn state of the diaper. Thus, the caretaker can easily recognize a color change of the non-layered portion 52 due to its color reaction.

When the diaper 10 according to the present embodiment is worn by a male dog, unlike the instance of a female dog, the external excretory organ of the male dog is positioned facing the first end 25A of the absorbent layer 25. For this reason, when the urine is absorbed by the first end 25A of the absorbent layer 25, and then flows/diffuses to the intermediate portion 25C and the second end 25B, and when a utilization ratio of the entire absorbent layer 25 by the urine has become more than 100%, the urine exudes outside from the rear end edge 40b of the absorbent core 40, and the non-layered portion 52 shows a color reaction by coming in contact with the urine. Unlike this instance, for the instance of a female dog, even if the utilization ratio of the entire absorbent layer 25 by the urine is less than 100%, the utilization ratio at the second end 25B and its vicinity facing the external excretory organ becomes more than 100%, and the non-layered portion 52 shows a color reaction by coming in contact with the urine exuded from the rear end edge 40b. Whereas, for the instance of the male dog, the color reaction of the non-layered portion 52 means that the utilization ratio of the entire absorbent layer 25 has become more than 100%, and the caretaker can change the diaper 10 in a state where the absorbed amount of the urine by the absorbent layer 25 has reached an upper limit.

The indicator 50 may extend from the longitudinal middle of the absorbent layer 25 to the dorsal region 12 so as to be visually recognized in a back view of the dog 5, and may not extend from the longitudinal middle of the absorbent layer 25 to the ventral region 11. Even in such an instance, the indicator 50 extends continuously from the stomach region of the dog 5 to the tail opening in a back view thereof, and the caretaker can easily recognize the indicator 50 and the color reaction thereof. Moreover, if the indicator 50 is formed so as not to extend from the longitudinal middle of the absorbent layer 25 to the ventral region 11, it is possible to suppress the material cost. Moreover, the indicator 50 may be formed of only a portion thereof extending from the lateral axis Q of the diaper body 14 to the dorsal region 12. Even in such an instance, the exuding urine from the rear end edge 40b of the absorbent core 40 can be recognized, and it is possible to suppress the material cost.

Although not shown, in a production process of the diaper 10, the indicator 50 is preferable to form after forming the cutting line 30. The diaper 10 is produced by a producing line to transport its components at high speed in a machine direction, and when the cutting line 30 is formed after the indicator 50 has been formed, the cutting line 30 is formed so as to encircle part of the indicator 50, and it is difficult to adjust the alignment and the indicator 50 may be cut by a positional displacement of a cutting means. Such a problem can be avoided by providing an indicator forming step after a cutting line forming step in the production line.

Figure 7:
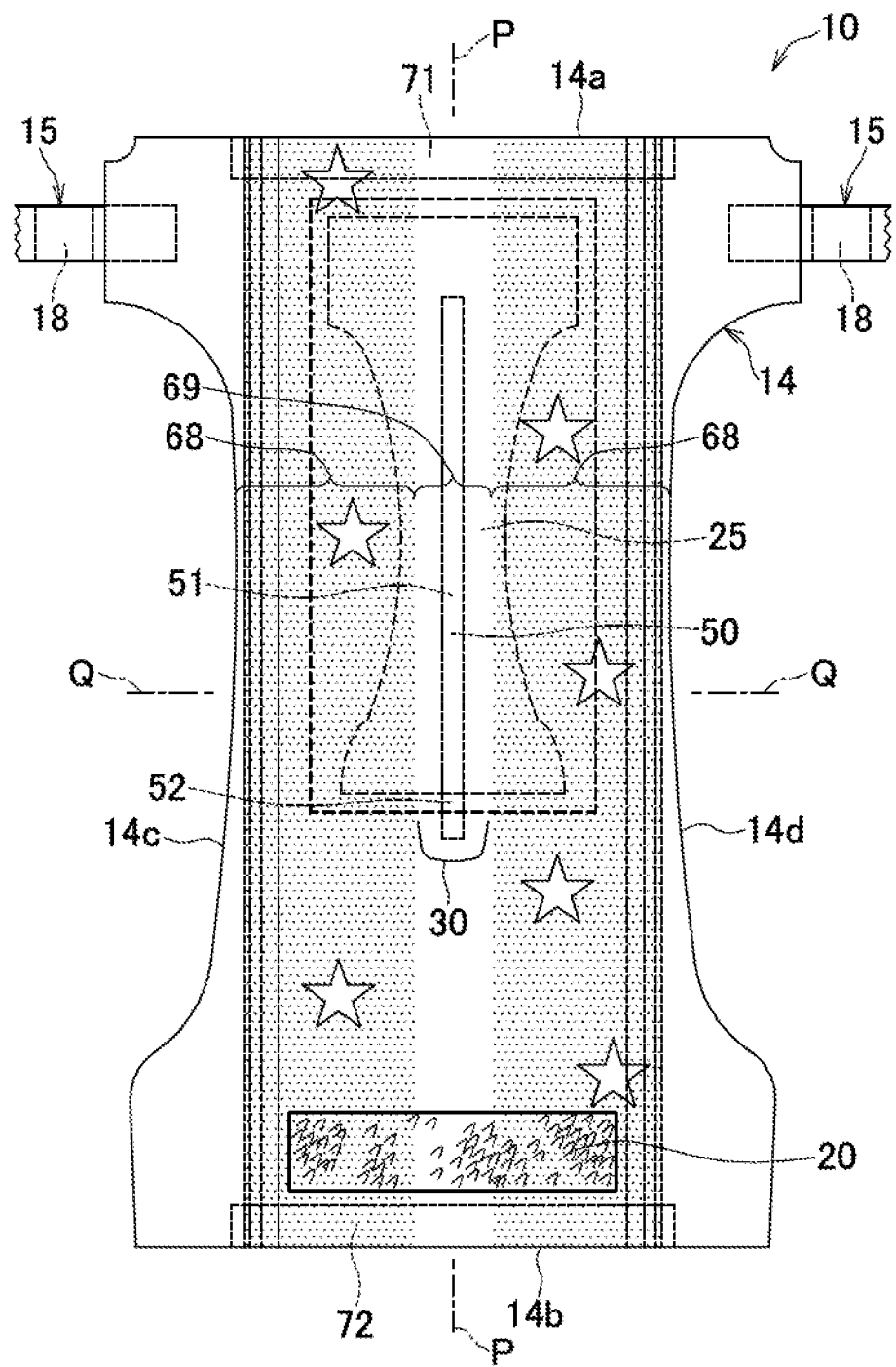
FIG. 7 is a back plan view of the flat-opened diaper in one modification embodiment.

FIG. 7 is a plan view of the back side in an example of the diaper 10 according to the present modification embodiment. In the present modification embodiment, the entire outer surface (the body non-facing surface of the outer sheet layer 23) of the diaper body 14 includes a graphic area (colored area) 68 visually recognized from the outside and a non-graphic area (non-colored area) 69 in order to give designability on the outer surface. The graphic area may include, in addition of coloring, decorative elements such as designs, characters, or letters. In the illustrated example, there are arranged with colored or whiten star shapes on a background having a dot pattern. The graphic area 68 printed on the body non-facing surface of the leakage barrier sheet 26 may be formed so as to be seen through the outer sheet layer 23, or may be printed on the outer surface of the outer sheet layer 23. If the graphic area is printed on the leakage barrier sheet 26, the outer sheet layer 23 is preferable to have total light transmittance enough to be clearly visible from the outside.

The graphic area 68 extends in the longitudinal direction Y on both sides of the diaper body 14, and the non-graphic area 69 extends in the longitudinal direction Y while overlapping with the longitudinal axis P. The non-graphic area 69 is overlapped with the indicator 50 dividing the absorbent layer 25 longitudinally in planar view. If the indicator 50 is entirely overlapped with the graphic area 68 in planar view, even when the indicator 50 has produced a color reaction by coming in contact with the urine, a changed color on the indicator 50 may be difficult to be due to overlapping with the graphic area 68. However, the non-graphic area 69 and the indicator 50 have the foregoing arrangement, and the color of the indicator 50 can be clearly recognized from the outside. To have such an effect, at least part of the indicator 50 may be overlapped with the non-graphic area 69, and the non-layered portion 52 is preferable to be positioned overlapping with the non-graphic area 69. The non-graphic area 69 need not extend continuously between both end edges 14a, 14b, and may be formed of partially or continually arranged multiple parts.

Second Embodiment

Figure 8:
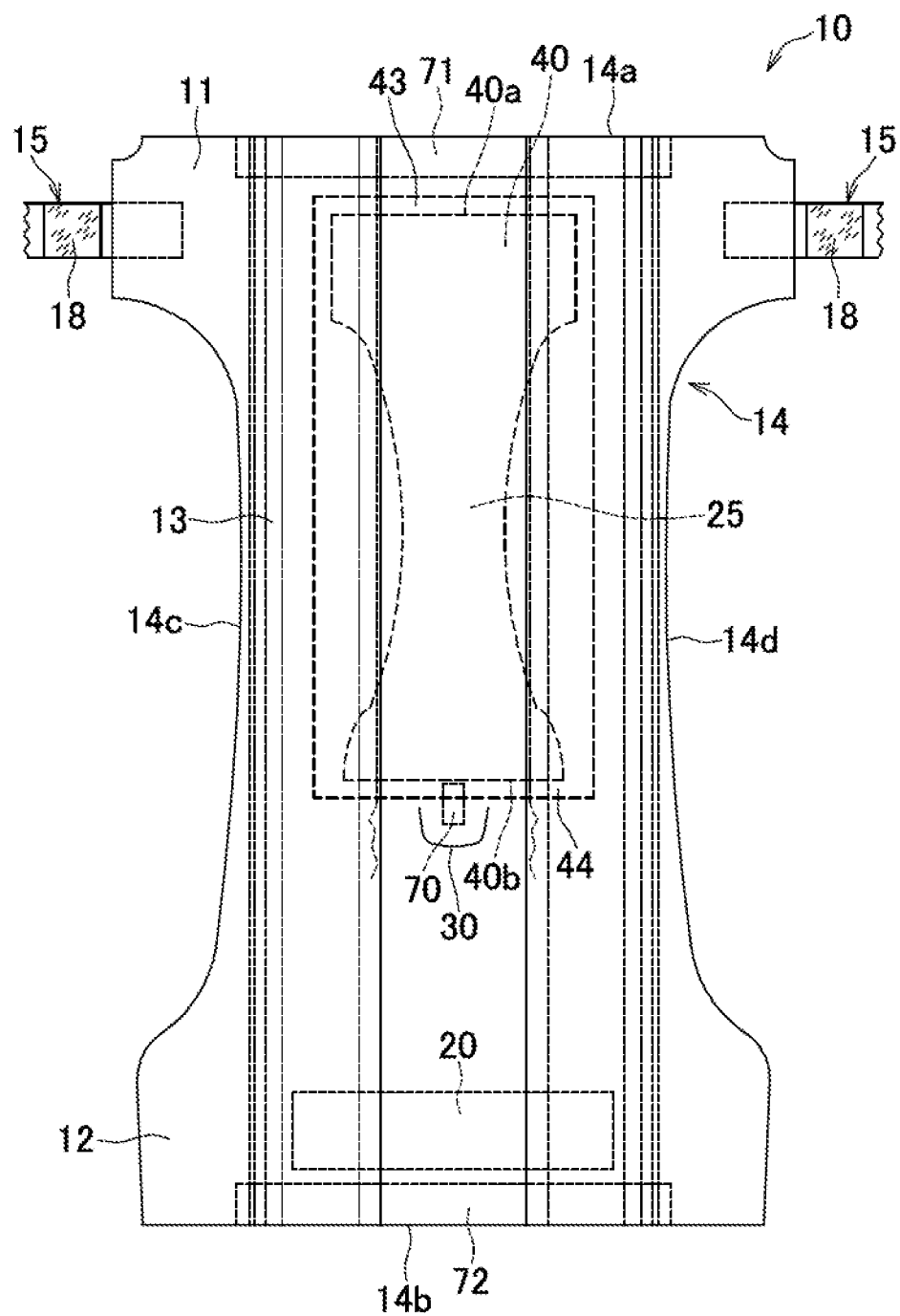
FIG. 8 is a plan view similar to FIG. 2 of the flat-opened diaper in a second embodiment.

FIG. 8 is a plan view similar to FIG. 2 of the flat-opened diaper in a second embodiment. A basic structure of the diaper 10 according to the present embodiment is appropriately the same, and only different points are described below.

With reference to FIG. 8, an indicator 70 according to the present embodiment is formed by only a portion extending outward from the rear end edge 40b of the absorbent core 40 toward the dorsal region 12 without being overlapped with the absorbent core 40 in the thickness direction Z. The indicator 70 is not overlapped with the absorbent core 40 and the indicator 70 having such shape and arrangement does not have a function to let a caretaker know of the first urination. However, the indicator 70 shows a color reaction by the urine exuded from the rear end edge 40b, and has a function to let the caretaker know of the possibility that the urine may leak out of the tail opening after several urination.

Third Embodiment

Figure 9:
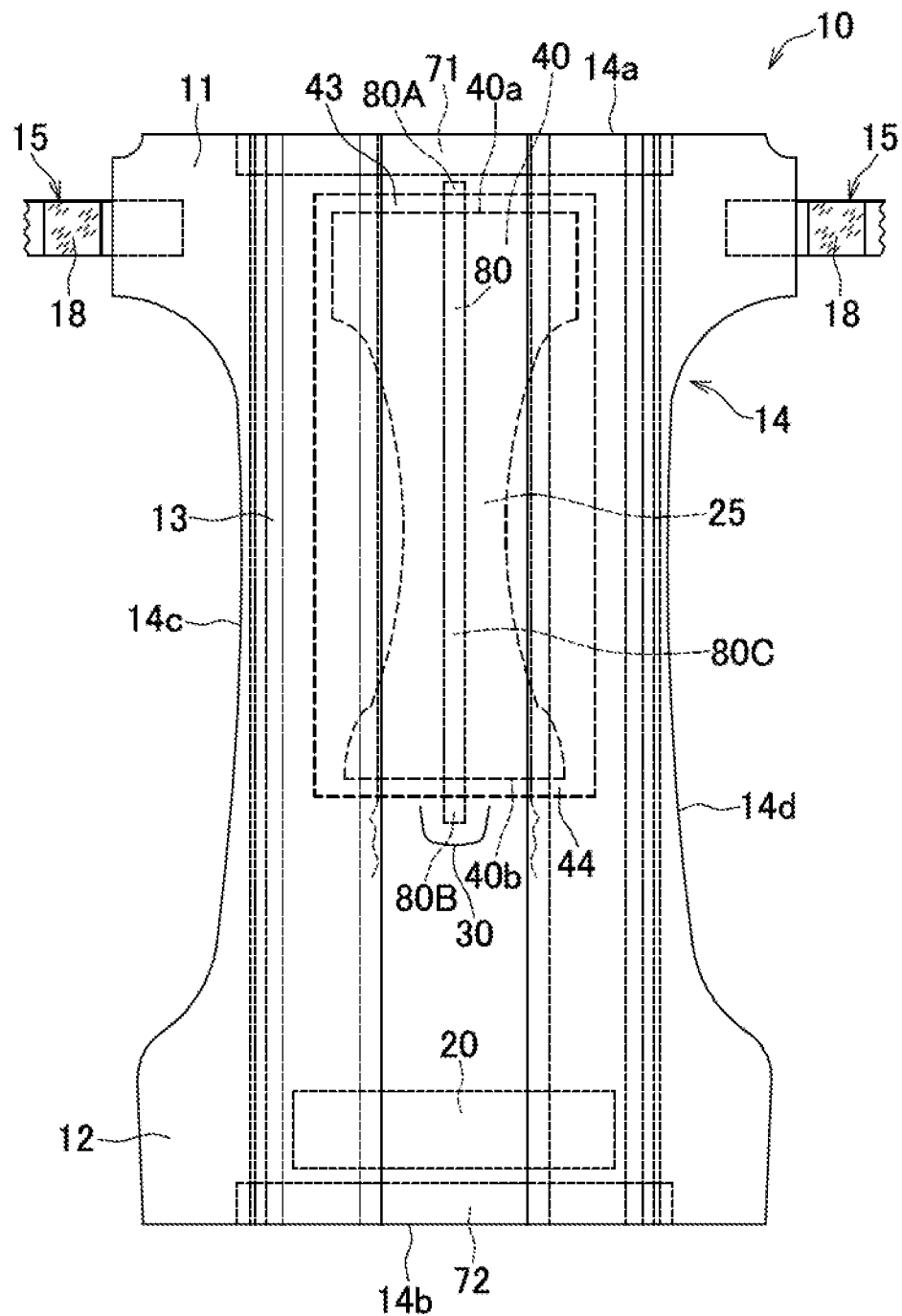
FIG. 9 is a plan view similar to FIG. 2 of the flat-opened diaper in a third embodiment.

With reference to FIG. 9, an indicator 80 according to the present embodiment divides the absorbent layer 25 in the longitudinal direction Y, wherein the indicator 80 includes a first non-layered portion 80A extending from the front end edge 40a of the absorbent core 40 to the outside in the longitudinal direction Y, a second non-layered portion 80B extending from the front end edge 40a of the absorbent core 40 to the outside in the longitudinal direction Y, and a layered portion 80C overlapped with the absorbent core 40 in the thickness direction Z, positioned between the first and second non-layered portions 80A, 80B. The indicator 80 has such a shape and arrangement, and the layered portion 80C overlapped with the absorbent core 40 in the thickness direction Z shows a color reaction by coming in contact with the urine when the dog 5 has urinated, and the caretaker can recognize the first urination. When a female dog 5 wears the diaper, the urine is excreted from the external excretory organ facing the second end 25B of the absorbent layer 25, and the second non-layered portion 80B shows a color reaction by coming in contact with the urine exuded from the rear end edge 40b of the absorbent core 40 due to repeating of the urination, and the caretaker can recognize the possibility that the urine may leak out of the tail opening.

On the other hand, when a male dog 5 wears the diaper, the urine is excreted from the external excretory organ facing the first end 25A of the absorbent layer 25, and the first non-layered portion 80A shows a color reaction by coming in contact with the urine exuded from the rear end edge 40b of the absorbent core 40 due to repeating of the urination, and the caretaker recognizes exuding of a large amount of the urine from the front end edge 40a of the absorbent core 40 toward the first end edge 14a of the diaper body 14 due to repeating of further urination, and can determine appropriate timing to change the diapers 10.

The components of the diaper 10, which is one example of a disposable diaper, are not limited to those described in the specification but other various types of materials widely used in the relevant technical field may be used without limitation. The terms "first", "second" and "third" used in the specification and claims of the present application are used merely to distinguish similar elements, similar positions, and other similar means.

REFERENCE SIGNS LIST 5 pet animal (dog)
10 absorbent article (diaper)
11 ventral region
12 dorsal region
13 intermediate region
25 absorbent layer
30 cutting line
40 absorbent core
40a front end edge (second end edge) of absorbent core
40b rear end edge (first end edge) of absorbent core
41 core cover sheet
50 indicator
70 indicator
80 indicator
51 layered portion
52 non-layered portion
68 graphic area
69 non-graphic area
X lateral direction
Y longitudinal direction
Z thickness direction

The invention claimed is:

1. An absorbent article for a pet animal having a longitudinal direction, a lateral direction, a thickness direction, a body facing surface, and a body non-facing surface, and comprising
a ventral region, a dorsal region, an intermediate region and an absorbent layer having an absorbent core and a rear end,
wherein:
the absorbent article further comprises a cutting line for forming a tail opening positioned adjacent to the rear end of the absorbent layer in the intermediate region, and an indicator positioned on the body non-facing surface of the absorbent layer and to show a color reaction by coming in contact with urine excreted by the pet animal,
the absorbent layer is positioned between the cutting line and the ventral region,
the absorbent core has a first end edge opposite to the cutting line and a second end edge opposite to the first end edge in the longitudinal direction,
the indicator is positioned longitudinally outboard of the first and second end edges of the absorbent core,
the indicator includes
a layered portion overlapping the absorbent core in the thickness direction, and
a non-layered portion extending longitudinally outboard from the first end edge of the absorbent core,
the cutting line has a shape convexly curved toward the dorsal region,
the non-layered portion of the indicator is positioned within an area defined by the cutting line, and
the indicator does not extend longitudinally outward of the cutting line.

2. The absorbent article according to claim 1, wherein the absorbent layer includes a hydrophilic core cover sheet covering at least one of the body facing surface and the body non-facing surface of the absorbent core, and
the core cover sheet and the indicator overlap each other in the thickness direction.

3. The absorbent article according to claim 2, wherein the core cover sheet has an end edge extending longitudinally outboard from the first end edge of the absorbent core, and
the end edge of the core cover sheet and the indicator overlap each other in the thickness direction.

4. The absorbent article according to claim 1, further comprising
a graphic area having a color being visually recognizable from an outside of the body non-facing surface, and
a non-graphic area,
wherein at least a part of the indicator overlaps the non-graphic area in the thickness direction.

* * * * *